US007490838B2

(12) United States Patent
Hyatt et al.

(10) Patent No.: US 7,490,838 B2

(45) Date of Patent: Feb. 17, 2009

(54) LOCKING FLANGE FOR AIRLINE CARTS

(75) Inventors: Saul Hyatt, Weston, CT (US); Kevin Greene, Rockville Centre, NY (US)

(73) Assignee: Duty Free Air and Ship Supply, Co., Miami, FL (US)

( * ) Notice: Subject to any disclaimer, the term of this patent is extended or adjusted under 35 U.S.C. 154(b) by 0 days.

(21) Appl. No.: 11/745,592

(22) Filed: May 8, 2007

(65) Prior Publication Data

US 2008/0276662 A1 Nov. 13, 2008

(51) Int. Cl.
*B62B 3/00* (2006.01)

(52) U.S. Cl. .......................... 280/47.35; 70/14; 70/164; 70/211; 70/212

(58) Field of Classification Search ..................... 70/14, 70/18, 202, 203, 211, 212, 101, 164, DIG. 64, 70/DIG. 65; 248/551–553; 280/47.35
See application file for complete search history.

(56) References Cited

U.S. PATENT DOCUMENTS

| | | | | |
|---|---|---|---|---|
| 3,118,685 | A * | 1/1964 | Jordan | 280/47.19 |
| 4,095,828 | A | 6/1978 | East | |
| 4,190,273 | A * | 2/1980 | Schaffrin | 292/288 |
| 4,473,176 | A * | 9/1984 | Harper | 224/569 |
| 5,397,176 | A * | 3/1995 | Allen et al. | 312/223.2 |
| 5,488,914 | A * | 2/1996 | Ouellette | 109/56 |
| 5,626,353 | A | 5/1997 | Campbell | |
| 5,782,115 | A * | 7/1998 | Judy | 70/164 |
| 6,018,968 | A * | 2/2000 | Sides | 70/14 |
| 6,139,034 | A * | 10/2000 | Williams | 280/47.35 |
| 6,192,722 | B1 * | 2/2001 | Galant | 70/58 |
| 6,234,498 | B1 * | 5/2001 | Saku et al. | 280/47.34 |
| 6,581,424 | B2 * | 6/2003 | Oliver | 70/164 |
| 6,619,770 | B1 | 9/2003 | Drab et al. | |
| 6,902,080 | B2 * | 6/2005 | Busch | 220/315 |
| 7,086,255 | B2 * | 8/2006 | Reason | 70/2 |
| 7,117,700 | B2 * | 10/2006 | Smith et al. | 70/225 |
| 7,191,887 | B2 * | 3/2007 | Schrumpf | 194/350 |
| 2004/0195790 | A1 * | 10/2004 | Wong Hahn | 280/47.19 |
| 2006/0037837 | A1 * | 2/2006 | Schrumpf | 194/350 |
| 2006/0243850 | A1 * | 11/2006 | Hartmann et al. | 242/529 |

* cited by examiner

*Primary Examiner*—Christopher P Ellis
*Assistant Examiner*—Katy Meyer
(74) *Attorney, Agent, or Firm*—Pablo Meles; Akerman Senterfitt

(57) ABSTRACT

A locking flange (200) for securing an airline cart (100) can include a hook shaped flange that wraps around a pull bar (130) of the airline cart, a pair of apertures (204) on opposing sides of the hook shaped flange where the apertures reside below the pull bar when the hook shaped flange is placed on top of the pull bar, and a locking mechanism (250) for insertion within the apertures once the flange is placed on top of the pull bar. The locking flange can project below a top plane of a door (102) of the airline cart. The locking flange can be made of metal such as high tensile steel. The locking mechanism can include a cylinder having a head (252) on one side and an aperture (256) on an opposing side for placement of a lock (502) through the aperture of the cylinder.

18 Claims, 6 Drawing Sheets

900

900

LOCKING FLANGE FOR AIRLINE CARTS

FIELD

This invention relates generally to locking mechanisms, and more particularly to a method and system for securing an airline cart using a flange.

BACKGROUND

Duty free items are currently sold on airline flights using modified food carts that are designed to stringent specifications dictated by the dimensions of the aircraft and Federal Aviation Administration (FAA) regulations. Existing airline food carts are generally retrofitted for such duty free items and are generally susceptible to tampering and pilfering by a number of parties including caterers, passengers, and other no-authorized personnel. It is difficult to secure such carts and to assure that only authorized personnel are gaining access to the contents inside such carts.

These airline carts are generally not locked and fail to provide an indication of tampering before the carts are transferred to authorized personnel. Even if such carts are lockable, once authorized personnel open the cart, there is no assurance or means of preventing pilfering and further tampering with the cart. Cart doors typically have pins on top and bottom portions of their doors to help "lock" the cart doors to the frame of such carts, but unauthorized personnel have been known to pry pins down or away to enable access to the carts. No simple solution is known to securely lock the doors to the frame of the cart that further prevents pilfering or unauthorized access.

SUMMARY

Embodiments in accordance with the present invention can provide a locking flange that can prevent or at least reduce the chances of tampering or unauthorized access to an airline cart. The flange, once locked, can minimize access to vulnerable locations on the airline cart that are typically used to pry or otherwise open such carts.

In a first embodiment of the present invention, a locking flange for securing an airline cart can include a hook shaped flange that wraps around a pull bar on the airline cart where the flange covers a substantial portion of the pull bar, a pair of apertures on opposing sides of the hook shaped flange where the apertures reside below the pull bar when the hook shaped flange is placed on top of the pull bar, and a locking mechanism for insertion within the apertures once the flange is placed on top of the pull bar. The locking flange can further include a lip that rests on or creates interference with a top horizontal surface of the airline cart below the pull bar. The locking flange can project below a top plane of a door for the airline cart. The locking flange can be made of metal such as high tensile steel. Of course, other metals or materials such as aluminum, Plexiglas, plastics, and carbon fiber, can be used, but high tensile steel is likely to be the most cost effective. The locking mechanism can include a cylinder having a head on one side and an aperture on an opposing side for placement of a lock through the aperture of the cylinder. The cylinder can further include a second aperture for receipt of a tamper proof binder. The cylinder can optionally or alternatively have a key mechanism.

In a second embodiment of the present invention, a system of securing an airline cart using a locking flange can include a cart having a frame and a top mounted pull bar attached to a top portion of the frame, a hook shaped flange that wraps around the pull bar on the airline cart where the flange covers a substantial portion of the pull bar, a pair of apertures on opposing sides of the hook shaped flange where the apertures reside below the pull bar when the hook shaped flange is placed on top of the pull bar and a locking mechanism for insertion within the apertures once the flange is placed on top of the pull bar. The locking flange can further include a lip that rests on or creates interference with a top horizontal surface of the airline cart below the pull bar. The locking flange can project below a top plane of a door for the airline cart. The flange can be made of metal such as high tensile strength steel among other metals or other materials. The aperture on at least one of the opposing sides of the hook shaped flange can be a receptacle for receiving an end of the locking mechanism. The locking mechanism can be a cylinder having a head on one side and an aperture on an opposing side for placement of a lock through the aperture of the cylinder. The cylinder can further include a second aperture for receipt of a tamper proof binder or tag. The locking mechanism can also be a cylinder having a key mechanism. The locking flange can include a long vertical member and a short vertical member that form the opposing sides of the hook shaped flange such that the long vertical member and the short vertical member are integrally coupled together using an apex member that rests on the pull bar when in a locked position. The locking flange can optionally include a side wall substantially perpendicular to the opposing sides of the hook shaped flange which is used to prevent tampering of frame elements on a side wall of the airline cart.

In a third embodiment of the present invention, a locking flange for securing an airline cart can include a hook shaped metallic flange having a long member wall and a short member wall substantially parallel to the long member wall where the flange wraps around a pull bar on the airline cart and covers a substantial portion of the pull bar, a pair of apertures through long member wall and the short member wall of the hook shaped flange where the apertures reside below the pull bar when the hook shaped flange is placed on top of the pull bar, and a locking mechanism in the form of a cylinder for insertion within the apertures once the flange is placed on top of the pull bar where the flange prevents tampering with a front door and frame members of the airline cart. The hook shaped metallic flange can be formed from a single metallic sheet that is bent and machined to conform to a shape of the airline cart and the pull bar.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
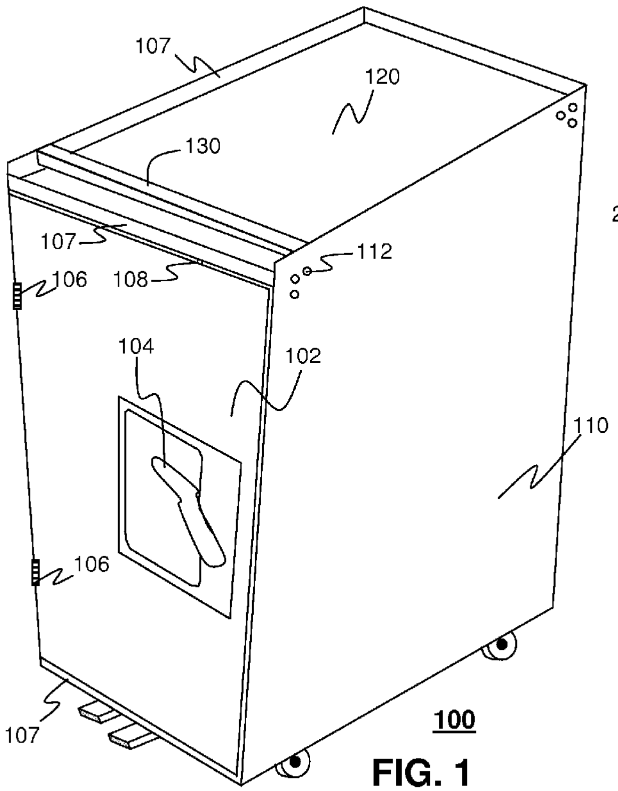
FIG. 1 is a perspective view of an airline cart used in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways that can minimize tampering or otherwise discourage unauthorized access and pilfering of airline carts. Such embodiments are not necessarily limited to the current requirements of the F.A.A. standards and can deviate from such standards, but most embodiments are certainly intended to be within such standards.

Referring to FIG. 1, an airline cart or a modified airline cart 100 is shown that can be used to carry duty free merchandise or other goods. Frequently, such carts in this industry are furnished or supplied to the airlines fully stocked with merchandise that can potentially have significant value. The stocked-up cart can be shipped or handled by caterers or various intermediary parties that can have unsupervised or minimally supervised access to the cart before reaching its ultimate destination on an airliner where the goods are sold. Even if such carts are locked in some form, once authorized personal open the cart and leave the cart unsupervised in either a locked or unlocked mode, the carts can still be susceptible to pilfering and tampering by prying or partially disassembling portions of the cart. Unauthorized personnel have been known to use crow-bars, screw-drivers and even handheld drills to gain access to the contents of the carts.

The airline cart 100 can include a front door 102 that pivots on hinges 106 which opens by a pulling or pushing a handle 104. The cart 100 can have a frame 107 that supports various walls 110 that forms the structure of the cart. The frame can also be attached to a top wall or member 120. The frame 107 can be attached using mechanical elements such as screws or rivets 112. The cart further includes a handle or pull bar 130 that can be affixed to the frame 107 or wall 110 and further rests above the top wall 120. In a locked position, the door can further include one or more pins 108 that secure the door 102 to the frame. As shown, the pin 108 goes into a top frame member of the cart, but can also include other pins that go into the bottom frame portions or other portions of the cart. As shown in this figure, the airline cart is accessible by disassembling walls or prying doors or prying pins.

Figure 2:
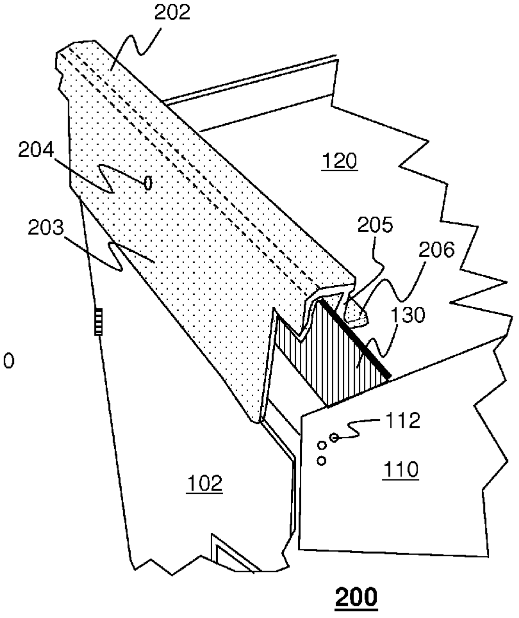
FIG. 2 is a partial perspective view of a locking flange being placed on the airline cart of FIG. 1 in accordance with an embodiment of the present invention.
Figure 3:
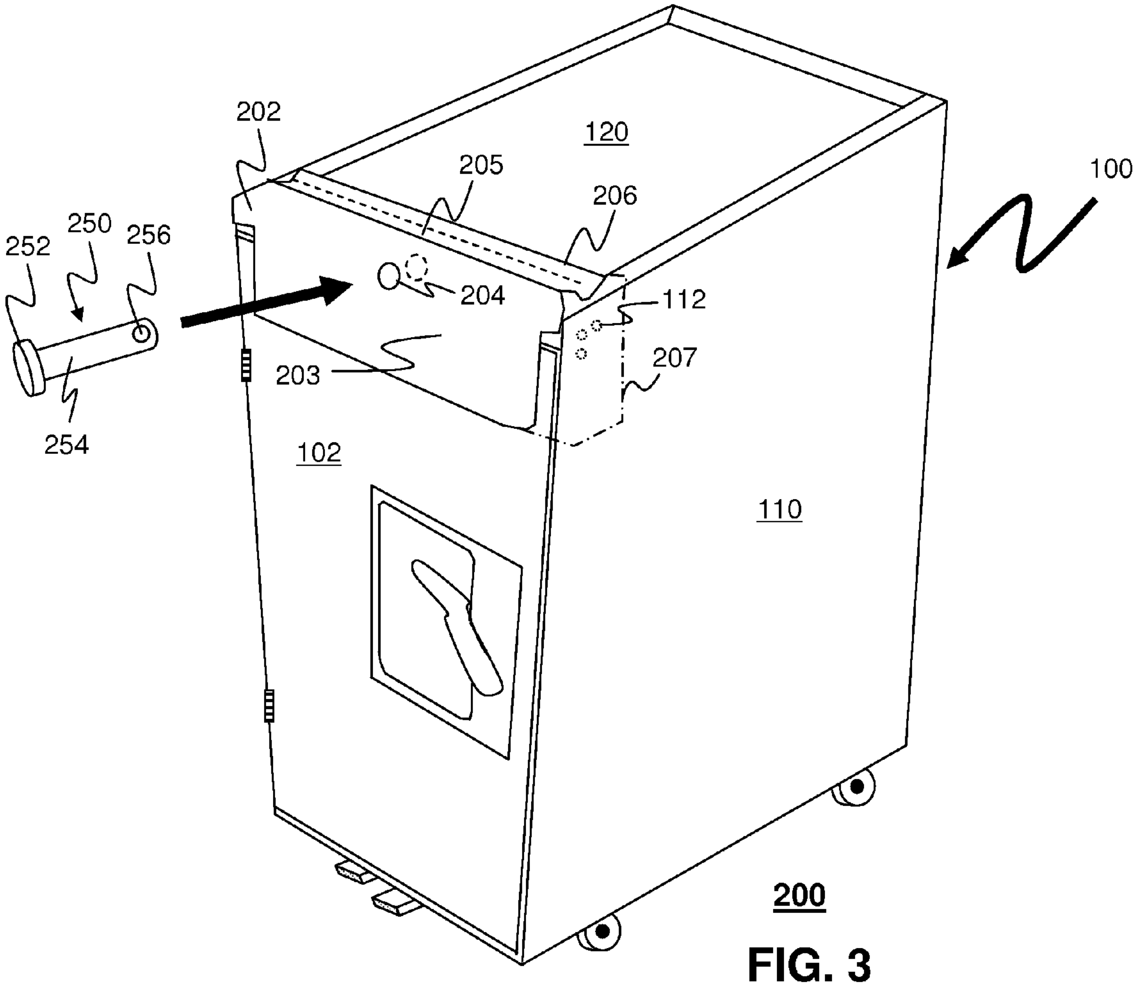
FIG. 3 is a perspective view of the locking flange and a locking mechanism in the form of a cylinder used for securing the airline cart in accordance with an embodiment of the present invention.
Figure 9:
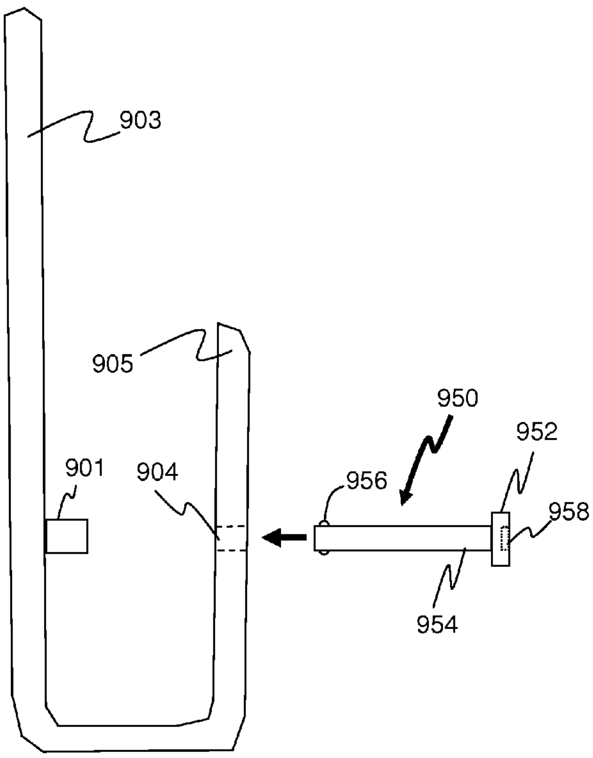
FIG. 9 is a side view of a locking flange with a locking mechanism about to be inserted in the locking flange in accordance with an alternative embodiment of the present invention.
Figure 10:
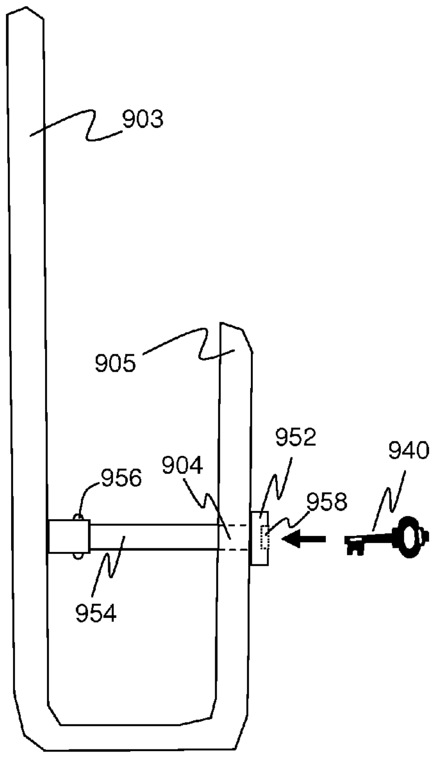
FIG. 10 is a side view of the locking flange of FIG. 9, illustrating the locking mechanism securely inserted into apertures of the locking flange in accordance with an embodiment of the present invention.

Referring to FIG. 2, a secure airline cart assembly 200 includes the airline cart 100 secured or bolstered by a flange 202. The flange 202 can include a long wall member 203 and a short wall member 205 that can be place on top of the pull bar 130 of the cart. The flange can be a hook shaped flange as shown that wraps around the pull bar 130 in a manner where the flange 202 covers a substantial portion of the pull bar. The flange can include at least one aperture 204 through or on opposing sides of the hook shaped flange where the apertures reside below the pull bar 130 when the hook shaped flange 202 is placed on top of the pull bar. Referring further to both FIGS. 2 and 3, the cart assembly 200 can further include a locking mechanism 250 for insertion within the apertures once the flange is placed on top of the pull bar 130. The locking mechanism 250 can be a cylinder 254 having a head 252 on one side and at least one aperture 256 (or alternatively, a protrusion or bump as shown in FIGS. 9 and 10) on an opposing side for facilitating the locking function using a lock or other means. The cylinder can further include a second aperture for receipt of a tamper proof binder. The cylinder can optionally or alternatively have a key mechanism.

The locking flange 202 can further include a lip 206 that rests on or creates interference with a top horizontal surface 120 of the airline cart below the pull bar. In some cart designs, the top horizontal surface 120 can leave a gap on the top surface and the lip 206 on the flange 202 can be constructed to cover such gap. In any event, the lip 206 can create further barriers to entry to the cart via the top horizontal surface 120. The locking flange can project below a top plane of a door for the airline cart. The locking flange 202 can optionally include a side wall 207 substantially perpendicular to the opposing sides (203 and 205) which can be used to further prevent tampering of frame elements on a side wall of the airline cart such as screws or rivets 112. The locking flange 202 can be made of metal such as high tensile steel. Of course, other metals or materials can be used, but high tensile steel is likely to be the most cost effective. The material used should generally make it difficult for access using handheld tools.

Figure 4:
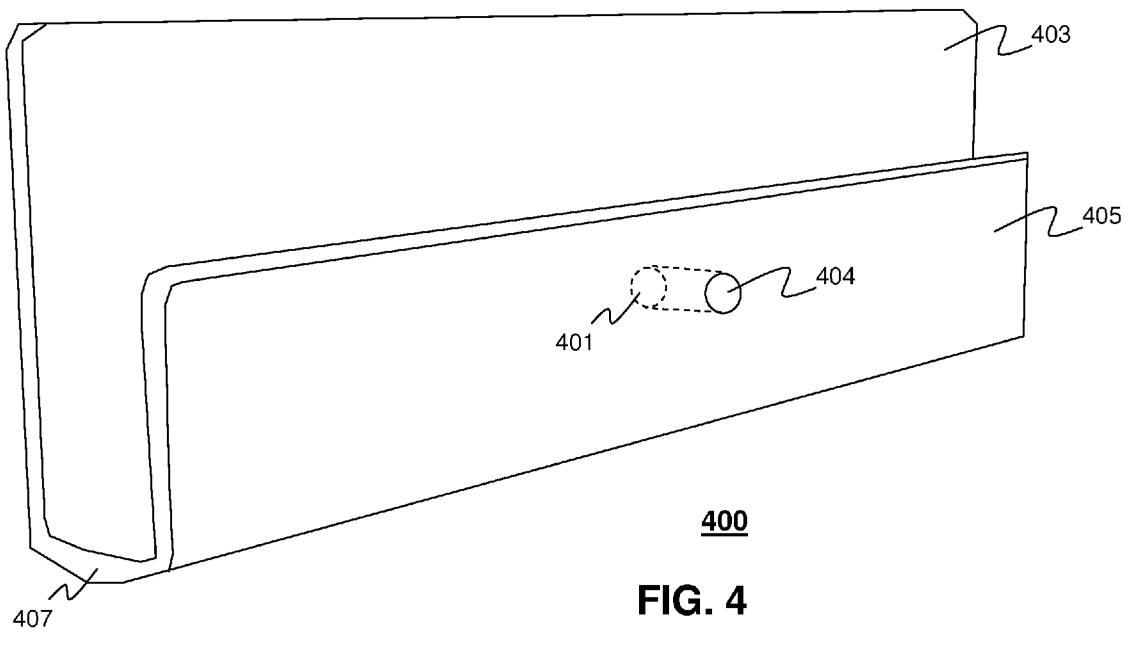
FIG. 4 is a perspective view of another locking flange that can be used to secure an airline cart in accordance with an embodiment of the present invention.

Referring to FIGS. 4-8, a locking flange 400 is shown in various orientations to provide a better perspective on how various embodiments can be implemented. In FIG. 4, the locking flange is shown having a long wall member 403 that is substantially oriented in parallel fashion to a short wall member 405. In one simple embodiment, the flange 400 can be made from a single relatively thick sheet of metal that is machined and bent to form the hook shaped flanged shown. The walls 403 and 405 can be coupled via an apex member 407. Although a single sheet is shown, embodiments are not limited to a single sheet and multiple portions can be welded or attached together to create the flange in the shape substantially as shown. The flange 400 can also be further bent or machined to provide notches, other shapes (e.g., lips), or smooth corners and edges as might be desired for a particular cart design. The flange 400 can further include at least one aperture through one of the walls 403 or 405. In the embodiment of FIGS. 4-8, the flange 400 includes aperture 404 through the wall 405 and aperture 401 through wall 403.

Figure 5:
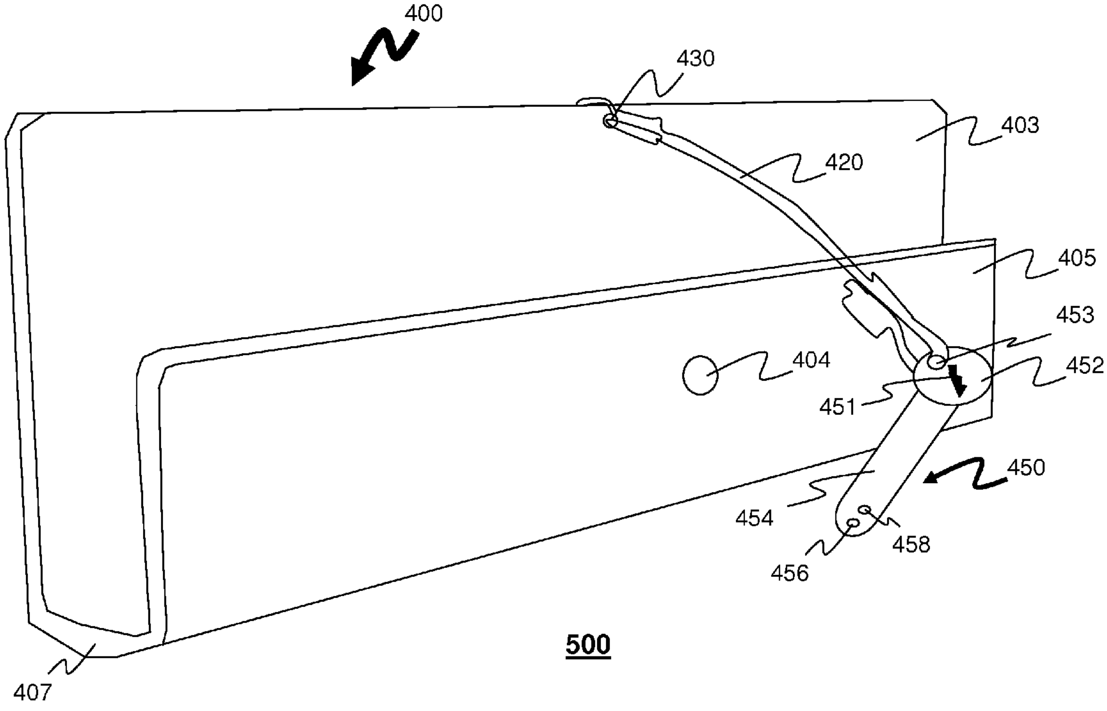
FIG. 5 is a perspective view of the locking flange of FIG. 4 along with a locking mechanism in the form of a cylinder used for securing an airline cart in accordance with an embodiment of the present invention.

Referring to FIG. 5, an assembly 500 can include the flange 400 of FIG. 4 as well as a locking mechanism 450 in the form of a cylinder having a a shank 454, a head 452 on one end of the shank 454, and at least one aperture on approximately an opposing end of the shank. In this embodiment, the shank 454 can include two apertures, aperture 456 and aperture 458. The assembly 500 can further optionally include a tether 420 attached to the flange 400 and the locking mechanism 450. The tether 420 can be attached to the flange 400 via an aperture 430 in the long wall member 403 and can be attached to the locking mechanism 450 via an aperture 453 on the head 452. The tether 420 is used primarily to prevent the loss of the locking mechanism 450 when it is removed. The locking mechanism 450 can optionally or alternatively include a key locking mechanism that uses key hole 451 and a key (not shown) as will become more apparent with explanation of FIGS. 9-10.

Figure 6:
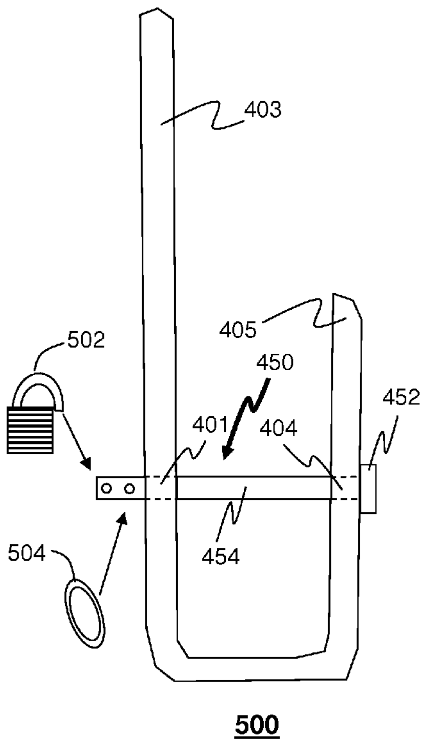
FIG. 6 is a side view of the locking flange of FIG. 4 with the locking mechanism inserted in the locking flange in accordance with an embodiment of the present invention.
Figure 7:
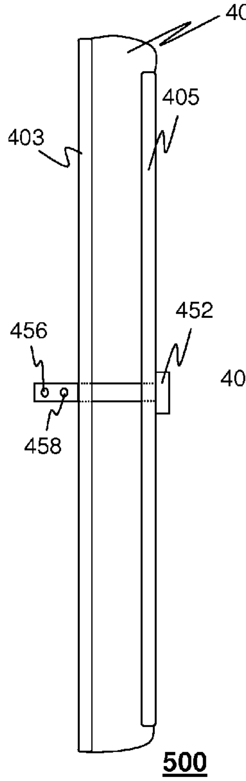
FIG. 7 is a top view of the locking flange of FIG. 4 with the locking mechanism inserted in the locking flange in accordance with an embodiment of the present invention.
Figure 8:
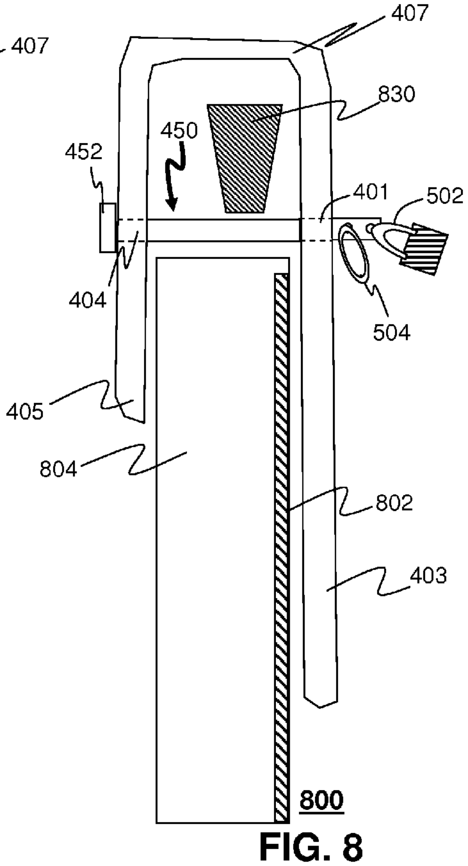
FIG. 8 is a side view of the locking flange of the locking flange of FIG. 4 with the locking mechanism inserted in the locking flange as locked on to a airline cart in accordance with an embodiment of the present invention.

With further respect to FIGS. 6-8, the flange 400 is shown with the locking mechanism 450 inserted in the flange 400 in a side view in FIG. 6 and from a top view in FIG. 7. In FIG. 8, the flange is shown mounted and locked on to a portion of an airline cart in the assembly 800. Operationally, the flange 400 can be simply mounted on top of a pull bar 830 to the extent that the apertures 401 and 404 are at least residing below the pull bar 830 and then the locking mechanism 450 is inserted through the apertures 404 and 401. Based on the dimensions of the flange 400 and the cart, the apex 407 might rest directly on top of the pull bar 830 or a gap can exist. In any event, the insertion of the locking mechanism 450 through the aperture 404 and 401 exposes the apertures 456 and 458 of the locking mechanism on an opposing side of one of the vertical walls. Note, the locking mechanism 450 can be placed in either direction (through aperture 404 then 401 as shown or alternatively through aperture 401 and then through 404). The apertures 456 and 458 can be used to place a lock 502 and/or tamper proof ribbon or band 504 on the locking mechanism 450 to secure the flange 400 on to the airline cart. In FIG. 8, the long wall member 403 of the flange 400 prevents or minimizes access to a front door 802 of the cart assembly 800 or to any pins (not shown) that might be used to secure the front door 802 to a frame member 804 of the cart.

Similarly, an alternative embodiment is shown in FIGS. 9 and 10 where side views of an assembly 900 can include a flange having a long wall member 903 that is substantially oriented in parallel fashion to a short wall member 905. The flange 400 can further include at least one aperture through one of the walls 903 or 905. In the embodiment of FIGS. 9-10, the flange includes aperture 904 through the wall 905 and aperture or receptacle 901 formed on the wall 903 instead of through the wall as in assembly 500 of FIGS. 5-7. The assembly 900 can include the flange as well as a locking mechanism 950 in the form of a cylinder having a shank 954, a head 952 on one end of the shank 954, and at least one bump or protrusion on approximately an opposing end of the shank. In this embodiment, the shank 954 can include one or more bumps or protrusions that can move in an unlocked mode as the locking mechanism 950 is traversed through the aperture 904 and aperture or receptacle 901. Once the locking mechanism 950 is in place and the bump or bumps 956 are set within the aperture or receptacle 901, the bump or bumps 956 can be fixed in a locked mode by turning a key 940 within a keyhole 958 within the locking mechanism 950. Of course, the embodiments are not necessarily limited to using a key or a cylinder shape or bumps to provide the locking functions. Further note that the hook shaped flange does not necessarily need to be in the shape of a "J" or "U", but will generally have two opposing walls that are substantially parallel and further include a means of locking the flange down on to the airline cart using the pull bar of the airline cart. Further note that the flange generally covers all or a substantial portion of the width of the front door of the airline cart.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A locking flange for securing an airline cart, comprising: a hook shaped flange that wraps around a pull bar on the airline cart, wherein the flange covers a substantial portion of the pull bar; a pair of apertures on opposing sides of the hook shaped flange, wherein the apertures reside below the pull bar when the hook shaped flange is placed on top of the pull bar; and a locking mechanism for insertion within the apertures once the flange is placed on top of the pull bar; wherein the locking flange projects below a top plane of a door on the airline cart, thereby preventing entry to the cart.

2. The locking flange of claim 1, wherein the locking flange further comprises a lip that rests on and creates interference with a top horizontal surface of the airline cart below the pull bar.

3. The locking flange of claim 1, wherein the locking flange is comprised of metal.

4. The locking flange of claim 1, wherein the locking flange is comprised of high tensile strength steel.

5. The locking flange of claim 1, wherein the locking mechanism is a cylinder having a head on one side and an aperture on an opposing side for placement of a lock through the aperture of the cylinder.

6. The locking flange of claim 5, wherein the cylinder further comprises a second aperture for receipt of a tamper proof binder.

7. The locking flange of claim 1, wherein the locking mechanism is a cylinder having a key mechanism.

8. A system of securing an airline cart using a locking flange, comprising: a cart having a frame and a top mounted pull bar attached to a top portion of the frame; a hook shaped flange that wraps around the pull bar on the airline cart, wherein the flange covers a substantial portion of the pull bar; a pair of apertures on opposing sides of the hook shaped flange, wherein the apertures reside below the pull bar; and a locking mechanism for insertion within the apertures once the flange is placed on top of the pull bar; wherein the locking flange projects below a top plane of a door on the airline cart, thereby preventing entry to the cart.

9. The system of claim 8, wherein the locking flange further comprises a lip that rests on and creates interference with a top horizontal surface of the airline cart below the pull bar.

10. The system of claim 8, wherein the aperture on at least one of the opposing sides of the hook shaped flange is a receptacle for receiving an end of the locking mechanism.

11. The locking flange of claim 8, wherein the locking flange is comprised of high tensile strength steel.

12. The system of claim 8, wherein the locking mechanism is a cylinder having a head on one side and an aperture on an opposing side for placement of a lock through the aperture of the cylinder.

13. The system of claim 12, wherein the cylinder further comprises a second aperture for receipt of a tamper proof binder.

14. The system of claim 8, wherein the locking mechanism is a cylinder having a key mechanism.

15. The system of claim 8, wherein the locking flange comprises a long vertical member and a short vertical member that form the opposing sides of the hook shaped flange, wherein the long vertical member and the short vertical member are integrally coupled together using an apex member that rests on the pull bar when in a locked position.

16. The system of claim 8, wherein the locking flange further comprises a side wall substantially perpendicular to the opposing sides of the hook shaped flange which is used to prevent tampering of frame elements on a side wall of the airline cart.

17. A locking flange for securing an airline cart, comprising: a hook shaped metallic flange having a long member wall and a short member wall substantially parallel to the long member wall, wherein the flange wraps around a pull bar on the airline cart and covers a substantial portion of the pull bar; a pair of apertures through the long member wall and the short member wall of the hook shaped flange, wherein the apertures reside below the pull bar when the hook shaped flange is placed on top of the pull bar; and a locking mechanism in the form of a cylinder for insertion within the apertures once the flange is placed on top of the pull bar, wherein the flange prevents tampering with a front door and frame members of the airline cart; wherein the locking flange protects below a top plane of a door on the airline cart, thereby preventing entry to the cart.

18. The locking flange of claim 17, wherein the hook shaped metallic flange is formed from a single metallic sheet that is bent and machined to conform to a shape of the airline cart and the pull bar and wherein the locking flange covers all or a substantial portion of a width of a door of the airline cart.

* * * * *